(12) United States Patent
Ren et al.

(10) Patent No.: US 12,439,305 B2
(45) Date of Patent: Oct. 7, 2025

(54) MACHINE LEARNING HANDOVER PREDICTION BASED ON SENSOR DATA FROM WIRELESS DEVICE

(71) Applicant: QUALCOMM Incorporated, San Diego, CA (US)

(72) Inventors: Yuwei Ren, Beijing (CN); Liangming Wu, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/926,557

(22) PCT Filed: Jul. 9, 2020

(86) PCT No.: PCT/CN2020/101091
§ 371 (c)(1),
(2) Date: Nov. 18, 2022

(87) PCT Pub. No.: WO2022/006814
PCT Pub. Date: Jan. 13, 2022

(65) Prior Publication Data
US 2023/0209419 A1    Jun. 29, 2023

(51) Int. Cl.
*H04W 36/00* (2009.01)
*G06N 20/00* (2019.01)

(52) U.S. Cl.
CPC ...... *H04W 36/00837* (2018.08); *G06N 20/00* (2019.01); *H04W 36/0079* (2018.08); *H04W 36/0083* (2013.01)

(58) Field of Classification Search
CPC ....... H04W 36/00837; H04W 36/0079; H04W 36/0083; G06N 20/00
See application file for complete search history.

(56) References Cited

U.S. PATENT DOCUMENTS 11,069,214 B2 * 7/2021 Souloglou ............ G08B 19/00
11,665,605 B2 * 5/2023 Feki .................... H04L 41/149
370/331

(Continued)

FOREIGN PATENT DOCUMENTS

CN    105702041 A    6/2016
CN    105939416 A    9/2016

(Continued)

OTHER PUBLICATIONS

Aljeri N., et al., "An Efficient Handover Trigger Scheme for Vehicular Networks Using Recurrent Neural Networks", Qos and Security For Wireless and Mobile Networks, ACM, 2 Penn Plaza, Suite 701, New York, 10121-0701, USA, Nov. 25, 2019, pp. 85-91.

(Continued)

*Primary Examiner* — Kenny S Lin
(74) *Attorney, Agent, or Firm* — QUALCOMM Incorporated

(57) ABSTRACT

A method of wireless communication by a user equipment (UE), comprises inputting sensor data, captured at the UE, to a local machine learning model. The method also includes extracting features from the sensor data, with the local machine learning model, while anonymizing the sensor data. The method further includes transmitting the features to a base station, and receiving a handover decision from the base station based on the features. A method of wireless communication by abase station inputs anonymized sensor feature data, received from a user equipment (UE), into a network machine learning model. The base station also inputs handover decision information into the network machine learning model. The method further includes inferring a handover decision based on the handover decision information and the anonymized sensor feature data, and transmitting the handover decision to the UE.

35 Claims, 11 Drawing Sheets

(56) References Cited

U.S. PATENT DOCUMENTS

| | | |
|---|---|---|
| 2011/0059741 A1 | 3/2011 | Klein |
| 2018/0255023 A1* | 9/2018 | Whaley ............... H04L 63/0421 |
| 2019/0364492 A1 | 11/2019 | Azizi et al. |
| 2020/0015318 A1 | 1/2020 | Garg et al. |
| 2020/0249039 A1* | 8/2020 | Lassoued ................ G01C 21/20 |
| 2020/0314719 A1* | 10/2020 | Tofighbakhsh ....... H04W 36/04 |
| 2022/0021469 A1* | 1/2022 | Veijalainen ............ H04B 17/29 |
| 2022/0312289 A1* | 9/2022 | Horita ................. H04W 36/324 |

FOREIGN PATENT DOCUMENTS

| | | | | |
|---|---|---|---|---|
| CN | 107396306 A | 11/2017 | | |
| CN | 109447275 A | 3/2019 | | |
| CN | 110662264 A | 1/2020 | | |
| CN | 111123340 A | 5/2020 | | |
| CN | 111246429 A | 6/2020 | | |
| EP | 3594842 A1 * | 1/2020 | ......... | G06F 21/6254 |
| WO | 2019172813 A1 | 9/2019 | | |
| WO | 2020114606 A1 | 6/2020 | | |
| WO | 2020139181 A1 | 7/2020 | | |

OTHER PUBLICATIONS

Nakashima K., et al., "Impact of Input Data Size on Received Power Prediction Using Depth Images for mmWave Communications", 2018 IEEE 88th Vehicular Technology Conference, IEEE, Aug. 27, 2018, 5 Pages.

Supplementary European Search Report—EP20944676—Search Authority—Munich—Feb. 27, 2024.

Huawei, et al., "Use Case and Potential Solutions of MDA Assisted EE," 3GPP TSG-SA5 Meeting #129e, e-meeting, S5-201315, Feb. 24-Mar. 4, 2020, (Mar. 4, 2020), the whole document, 4 pages.

International Search Report and Written Opinion—PCT/CN2020/101091—ISA/EPO—Apr. 12, 2021.

* cited by examiner

MACHINE LEARNING HANDOVER PREDICTION BASED ON SENSOR DATA FROM WIRELESS DEVICE

FIELD OF THE DISCLOSURE

Aspects of the present disclosure generally relate to wireless communications, and more particularly to techniques and apparatuses for 5G new radio (NR) machine learning-based handover prediction by a network. The prediction is based on sensor data captured at a wireless device.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communication by a user equipment (UE), comprises inputting sensor data, captured at the UE, to a local machine learning model. The method also includes extracting features from the sensor data, with the local machine learning model, while anonymizing the sensor data. The method further includes transmitting the features to a base station, and receiving a handover decision from the base station based on the features.

According to another aspect, a method of wireless communication by a base station inputs anonymized sensor feature data, received from a user equipment (UE), into a network machine learning model. The method also inputs handover decision information into the network machine learning model. The method further includes inferring a handover decision based on the handover decision information and the anonymized sensor feature data, and transmitting the handover decision to the UE.

In yet another aspect of the present disclosure, an apparatus for wireless communications at a user equipment (UE), includes a processor and memory coupled with the processor. Instructions stored in the memory are operable, when executed by the processor, to cause the apparatus to input sensor data, captured at the UE, to a local machine learning model. The apparatus can also extract features from the sensor data, with the local machine learning model, while anonymizing the sensor data. The apparatus can further transmit the features to a base station, and receive a handover decision from the base station based on the features.

In still another aspect of the present disclosure, an apparatus for wireless communications at a base station, includes a processor and memory coupled with the processor. Instructions stored in the memory are operable, when executed by the processor, to cause the apparatus to input anonymized sensor feature data, received from a user equipment (UE), into a network machine learning model. The apparatus can also input handover decision information into the network machine learning model. The apparatus can further infer a handover decision based on the handover decision information and the anonymized sensor feature data, and transmit the handover decision to the UE.

In an aspect of the present disclosure, a user equipment (UE) for wireless communications includes means for inputting sensor data, captured at the UE, to a local machine learning model. The UE also includes means for extracting features from the sensor data, with the local machine learning model, while anonymizing the sensor data. The UE further includes means for transmitting the features to a base station, and means for receiving a handover decision from the base station based on the features.

In another aspect of the present disclosure, a base station for wireless communications includes means for inputting anonymized sensor feature data, received from a user equipment (UE), into a network machine learning model. The base station also includes means for inputting handover decision information into the network machine learning model. The base station further includes means for inferring a handover decision based on the handover decision information and the anonymized sensor feature data, and means for transmitting the handover decision to the UE.

In still another aspect of the present disclosure, a non-transitory computer-readable medium with program code recorded thereon is disclosed. The program code is executed by a user equipment (UE) and includes program code to input sensor data, captured at the UE, to a local machine learning model. The UE also includes program code to extract features from the sensor data, with the local machine learning model, while anonymizing the sensor data. The UE further includes program code to transmit the features to a base station, and program code to receive a handover decision from the base station based on the features.

In yet another aspect of the present disclosure, a non-transitory computer-readable medium with program code recorded thereon is disclosed. The program code is executed by a base station and includes program code to input anonymized sensor feature data, received from a user equipment (UE), into a network machine learning model. The base station also includes program code to input handover decision information into the network machine learning model. The base station further includes program code to infer a handover decision based on the handover decision information and the anonymized sensor feature data, and program code to transmit the handover decision to the UE.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
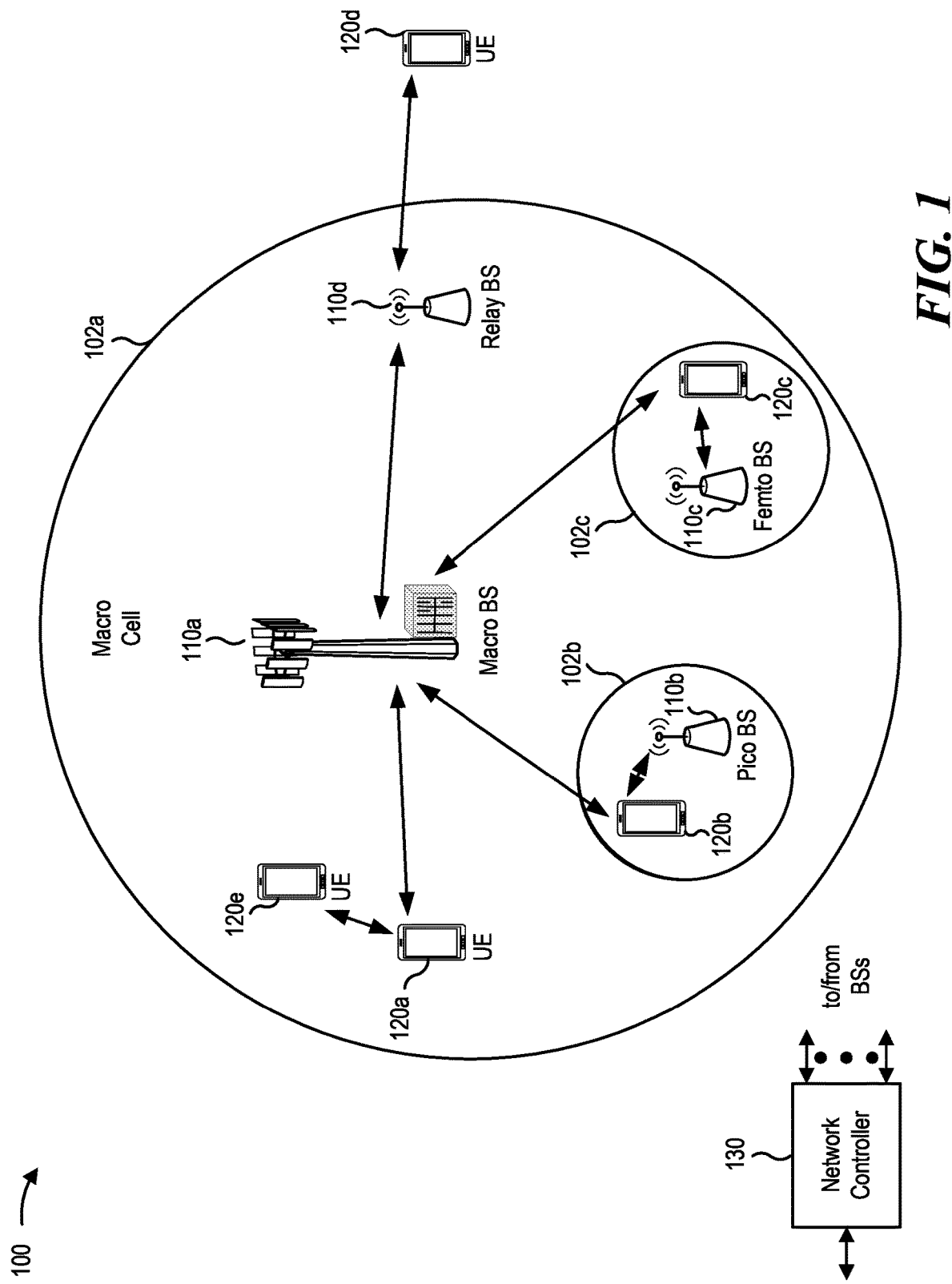
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Mobile devices, while communicating with a serving base station, may handover a call or data session to a target base station. For example, a UE may be traveling out of coverage of the source base station and into coverage of the target base station. With the increasing density of cells, frequent handover may increase network resource consumption. For example, the network may configure additional resources to measure signal strength from potential cells.

In one aspect of the present disclosure, machine learning methods are used for handover design and predictions. The machine learning model may receive predefined sensor data as the input, and output the handover design information. The machine learning model operates with UE personal information while addressing privacy concerns.

A local machine learning model (model-1) is defined at the UE side, for example, with convolutional layers. The local model receives as input, the sensor data, captured at the UE side. The local model extracts features from the sensor data, which anonymizes the data. In aspects of the present disclosure, the output of the local model is compressed sensor features, which maintains the information for the handover decision while removing private personal information.

A network machine learning model (model-2) is defined at the network side, for example, at the base station with fully connected (FC) layers. The network machine learning model receives as input, the extracted features from the UE side. The network machine learning model also receives as input, other information for the handover decision. The network machine model makes the decision for the handover. The output of the network machine model is the handover decision or prediction. The network may feedback the handover information to the UE.

In aspects of the present disclosure, the network defines the overall model structure, including the UE side model (model-1) and the network side model (model-2). The network also defines the content of the input sensors for the UE side model. An update of the model may be based on a UE request, or network control, or the update may occur in accordance with a predefined pattern.

Aspects of the disclosure relate to handover failure recovery and activating or deactivating the machine learning handover procedures. In one aspect, an indication from the UE to the base station requests a switch from a machine learning-based handover to a traditional, non-machine learning-based handover. In another aspect, an indication from the base station to the UE triggers a machine learning model.

According to aspects of the present disclosure, the UE side model is pre-trained to extract the sensor features. The UE side model is optimized offline to address privacy concerns. The network side model may also be pre-trained and may employ real-time optimization.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATS. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
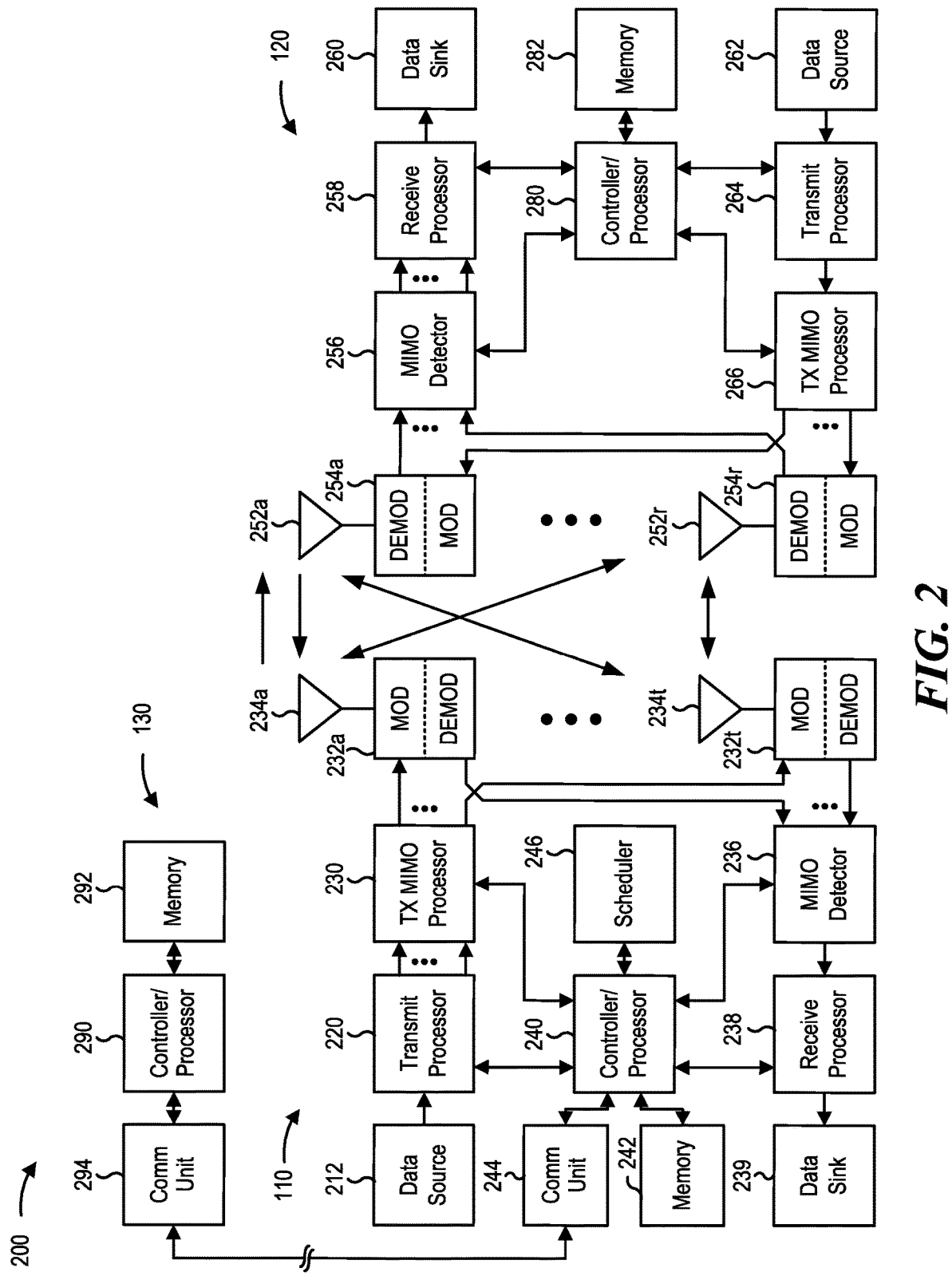
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for handover decisions, as described in more detail elsewhere. For example, the controller/processor 240 of the base station 110, the controller/processor 280 of the UE 120, and/or any other component(s) of FIG. 2 may perform or direct operations of, for example, the processes of FIGS. 9-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for inputting, means for extracting, means for transmitting, means for triggering, means for requesting, means for inferring, means for indicating, means for configuring, and/or means for increasing. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
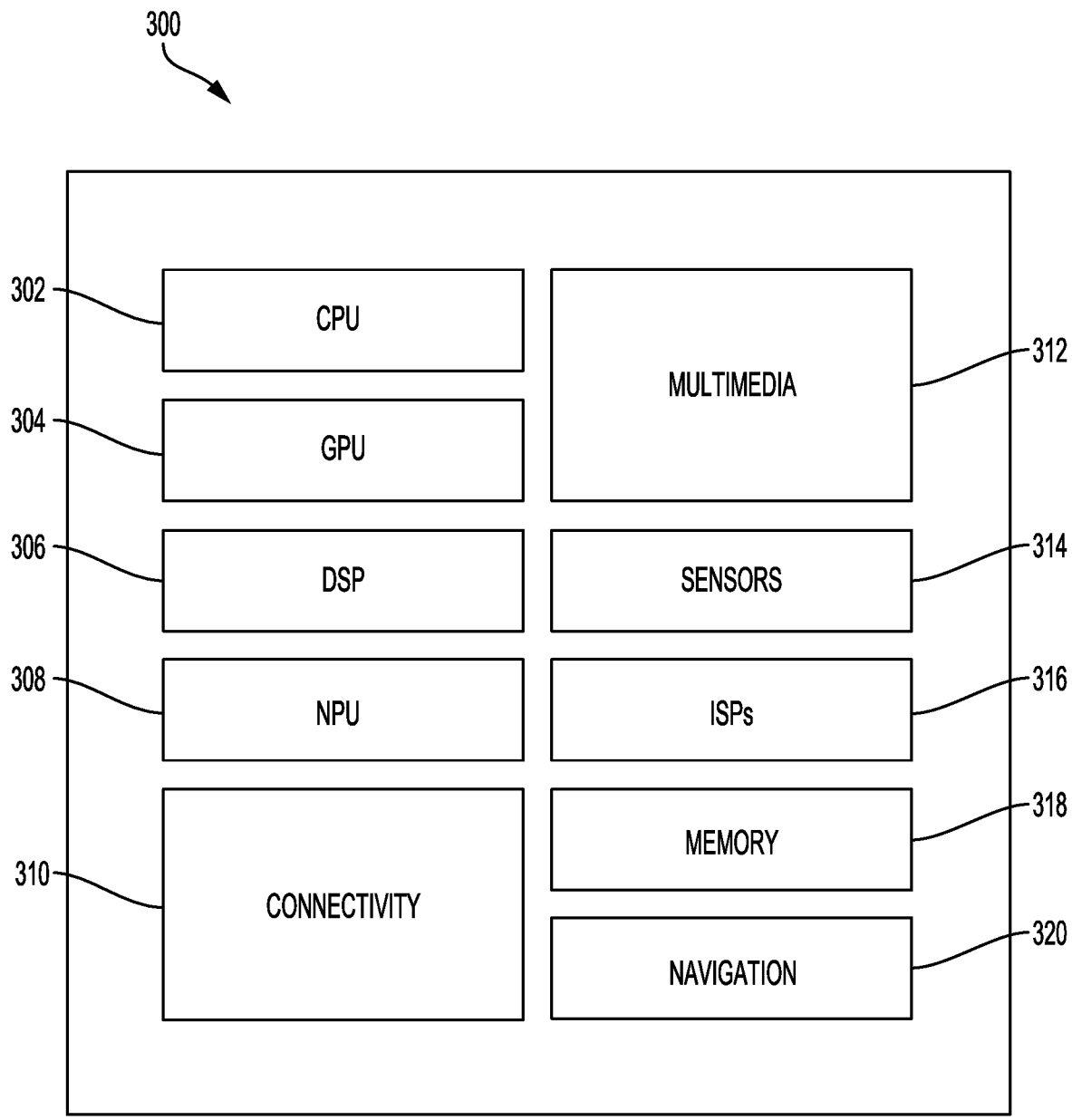
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for neural network processing, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to input sensor data, captured at the UE, to a local machine learning model; code to extract features from the sensor data, with the local machine learning model, while anonymizing the sensor data; code to transmit the features to a base station; code to receive a handover decision from the base station based on features; code to input anonymized sensor feature data, received from a user equipment (UE), into a network machine learning model; code to input handover decision information into the network machine learning model; code to infer a handover decision based on the handover decision information and the anonymized sensor feature data; and code to transmit the handover decision to the UE.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
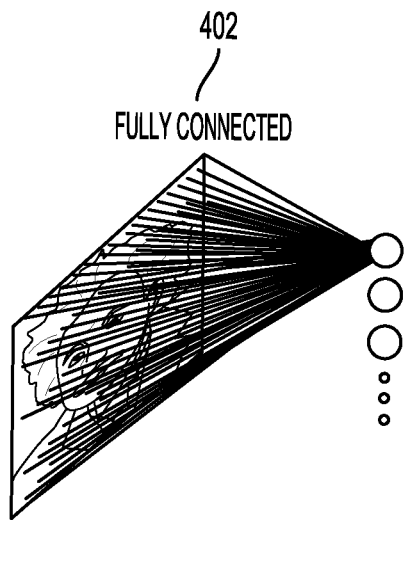
FIGS. 4A, 4B, and 4C are diagrams illustrating a neural network, in accordance with aspects of the present disclosure.
Figure 4B:
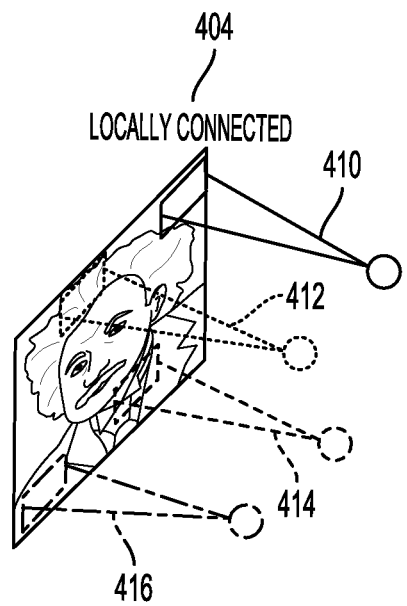

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
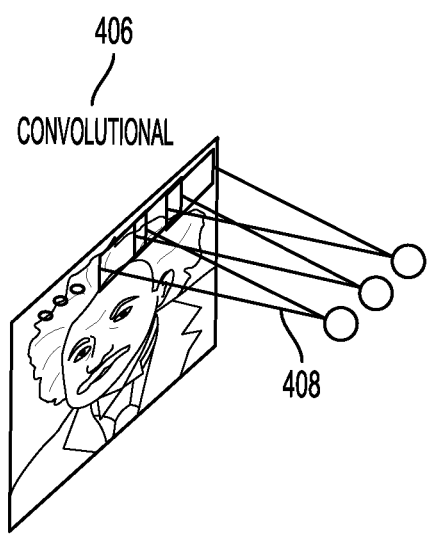

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
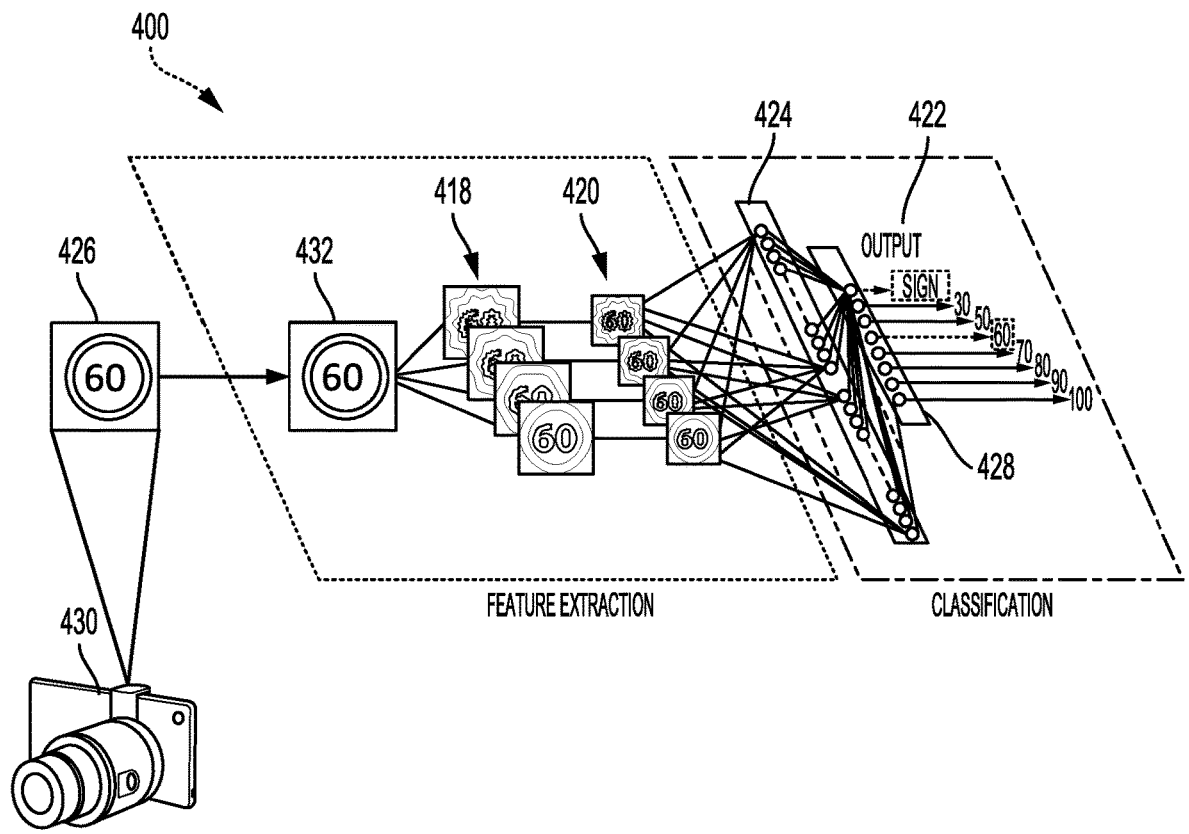
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
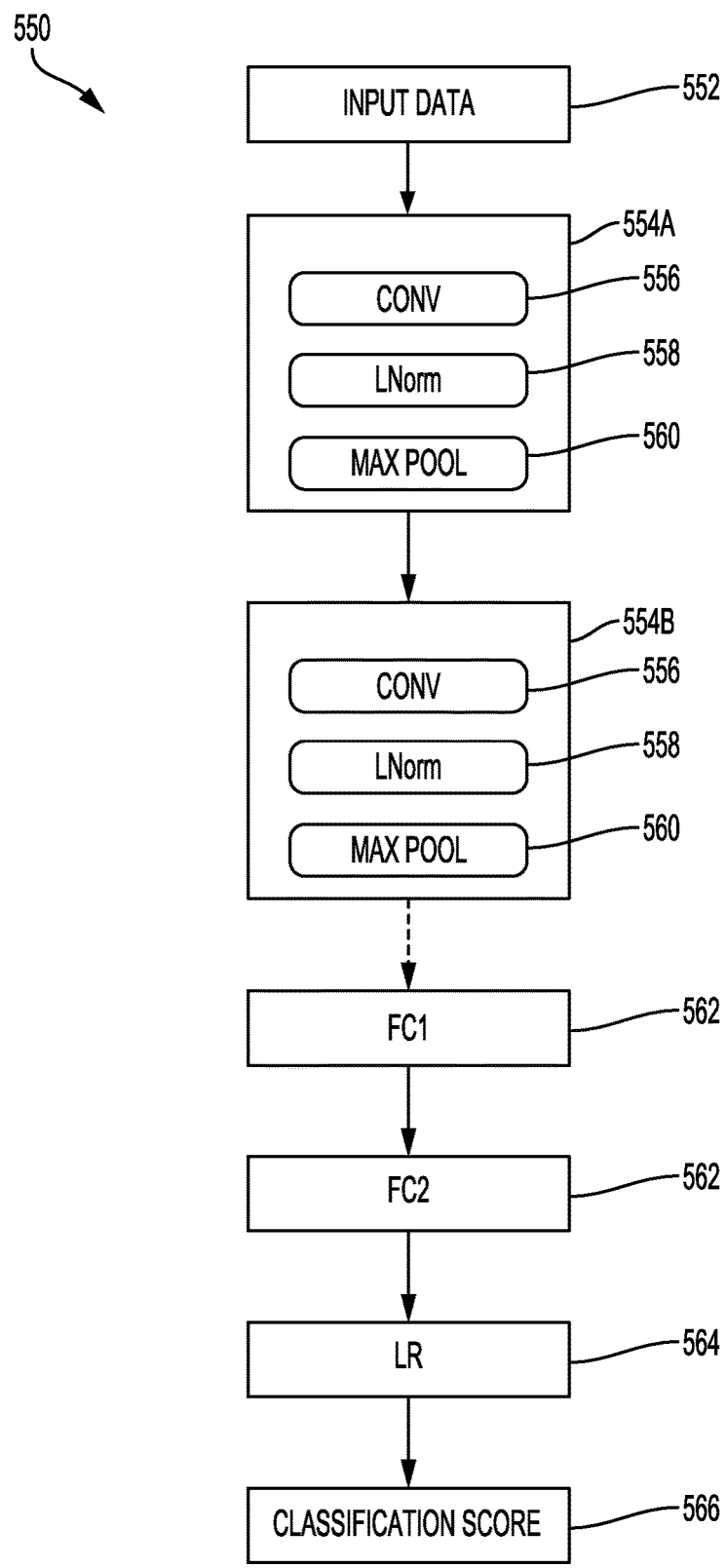
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Mobile devices, while communicating with a serving base station, may handover a call or data session to a target base station. For example, a UE may be traveling out of coverage of the source base station into coverage of the target base station. A traditional handover procedure may be generally summarized as a measurement-report-handover.

Figure 6:
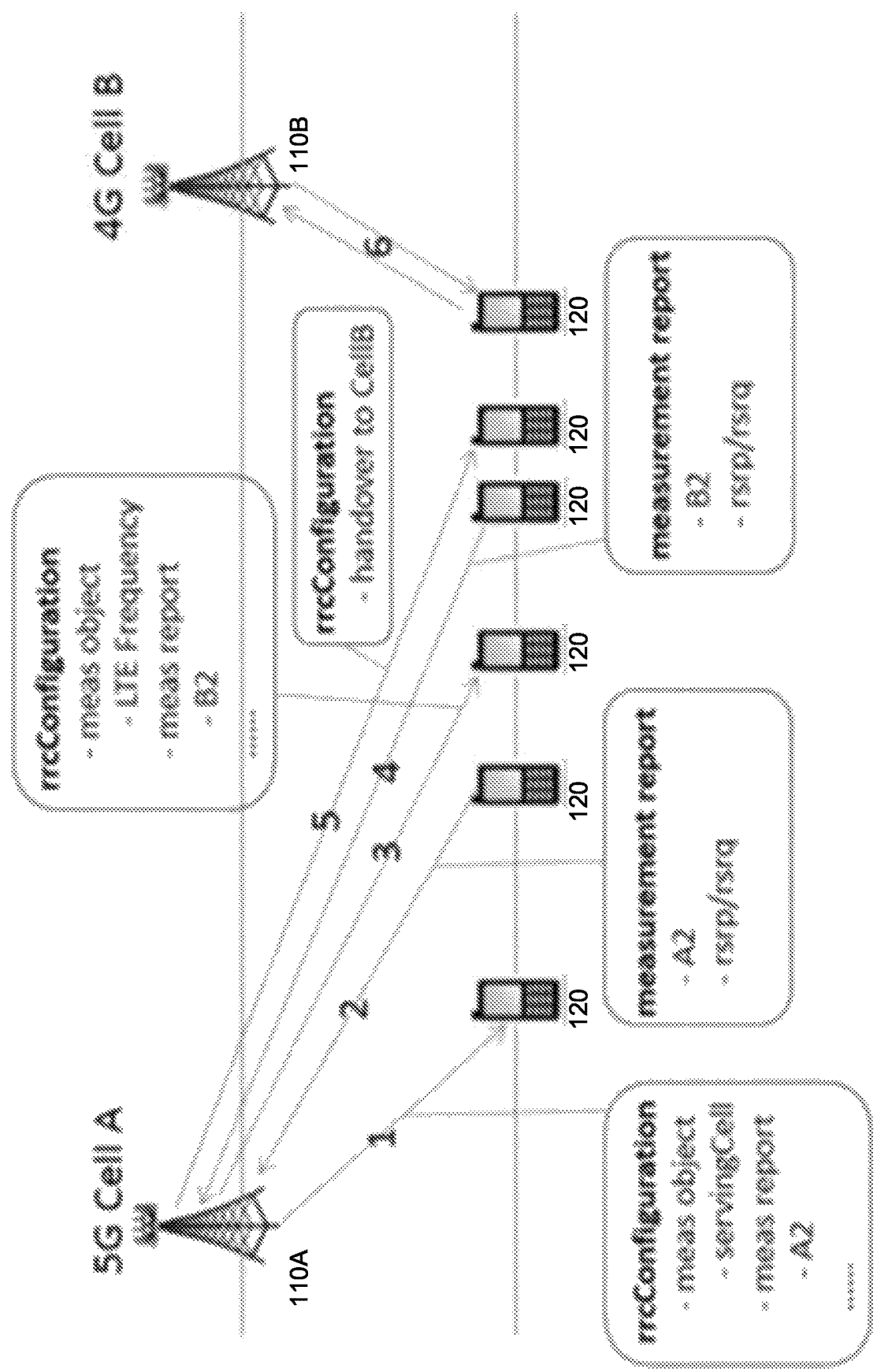
FIG. 6 is a block diagram showing a handover procedure for a user equipment (UE).

FIG. 6 is a block diagram showing a traditional handover procedure for a user equipment (UE). In the example handover procedure shown in FIG. 6, there are six steps to complete the handover from a serving 5G cell (e.g., 5G cell-A) 110A to a target 4G cell (e.g., 4G cell-B) 110B. Both the serving 5G cell 110A and the target 4G cell 110B may correspond to the base station 110 shown in FIGS. 1 and 2.

In step 1, a user equipment (UE) 120 (which may be the same UE 120 from FIG. 1 or FIG. 2) connects to cell-A 110A and receives a measurement configuration for the serving cell 110A. In step 2, the UE 120 measures the signal strength from the serving bases station 110A, determines the serving cell measurement is lower than a threshold, and reports an event A2 to the serving base station 110A. In step 3, based on the neighbor cells' configuration, the serving base station 110A configures a frequency for the UE 120 to measure neighbor cells, including the target base station 110B. In step 4, if the measurement of the neighbor cell 110B is larger than a threshold, the UE 120 reports an event B2 to the serving base station 110A. In step 5, the serving base station 110A sends a command for the handover from cell-A 110A to cell-B 110B. Finally, in step 6, the UE 120 accesses the target cell-B 110B, and performs uplink synchronization for data transmission. Handover between 5G cells or between macro and micro cells may use a similar procedure.

The standard (see for example, Third Generation Partnership Project (3GPP) 38.331, section 5.4) has defined events for the handover procedure, such as a serving cell measurement is larger than a threshold (event A1), a serving cell measurement is lower than a threshold (event A2), a neighbor cell measurement is larger than the serving cell measurement+offset (event A3), and a neighbor cell measurement is larger than a threshold (event A4). Additionally events may include, an inter-radio access technology (RAT) cell measurement is larger than a threshold (event B1), and an inter-RAT cell measurement is larger than a threshold and Spcell (primary cell of the master cell group) measurement is lower than the threshold (event B2).

Figure 7:
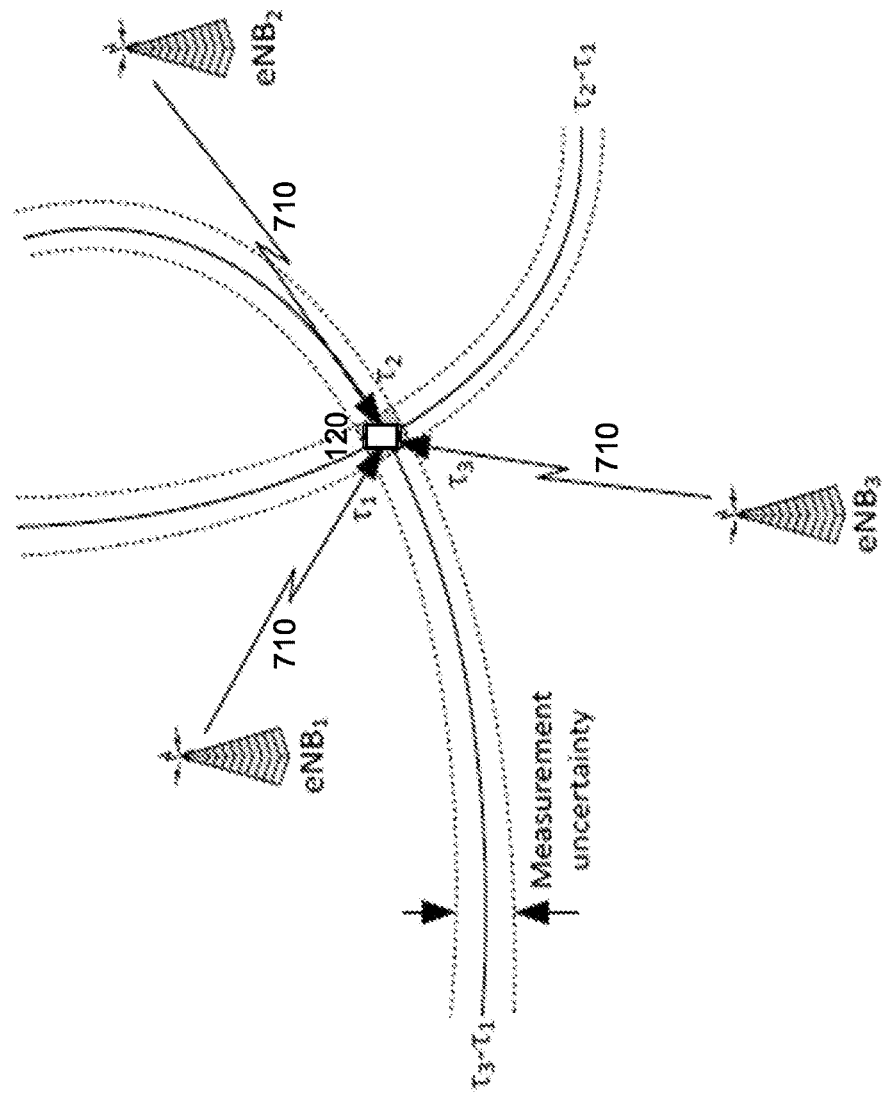
FIG. 7 is a block diagram showing observed time difference of arrival (OTDOA) positioning.

A UE position location may be obtained in a cellular network, for example, based on downlink and uplink communications. FIG. 7 is a block diagram showing observed time difference of arrival (OTDOA) positioning. As shown in FIG. 7, in observed time difference of arrival (OTDOA) positioning, downlink reference signals (RSs) 710 are provided from multiple cells (e.g., eNB1, eNB2 and eNB3) to a UE 120. The UE 120 measures a reference signal time-difference (RSTD) for each cell. Multilateral positioning-based RSTDs of multiple cells, with respect to a reference cell (e.g., eNB1 is the reference cell, eNB2 and eNB3 are the neighbor cells, RSTD_1 (Tao_1)) correspond to the 'line or surface' shown in FIG. 7, representing the locations that meet the time difference between eNB1 and eNB2. This is similar to RSTD_2 (Tao_2) for eNB1 and eNB3. The two equations (the two lines in FIG. 7) may provide the UE location.

Uplink time difference of arrival (UTDOA) is similar to OTDOA, however, UTDOA is based on uplink reference signals from the UE 120. The UE 120 transmits the uplink reference signal, and an eNodeB1/2/3 uses the time difference of arrival to locate the UE position. The reference signal may be a downlink reference signal for OTDOA, uplink reference signal for UTDOA, or based on the specific reference signal, such as a positioning reference signal.

Mobile devices rely on sensor capabilities. For example, global navigation satellite system (GNSS) data, such as global positioning system (GPS) data provides position information. GPS positioning accuracy is reliable for the outdoors, but may be less accurate indoors. Additionally, GPS is unable to provide accurate attitude positioning information. A proximity sensor detects when an object is near to the phone. The proximity sensor is most commonly used to sense when a phone is held up to the user's ear to turn off the display. Accelerometers in mobile phones are used to detect the orientation of the phone. A gyroscope adds an additional dimension to the information supplied by the accelerometer by tracking rotation or twist. A digital compass is usually based on a magnetometer sensor and provides mobile phones with a simple orientation in relation to the Earth's magnetic field. A camera provides environmental imaging. A radar sensor detects movement of objects and builds an environmental mapping. Although the sensors provide accurate information, constraints on privacy prevent widespread sharing of the information. Permission may be required for external usage of the sensors to address privacy concerns.

With the increasing density of cells, frequent handover may increase network resource consumption. For example, the network may configure additional resources to measure signal strength from potential cells. For higher frequencies, beam sweeping may be configured to align beams between the transmitter and receiver.

In some scenarios (e.g., a high-speed train, indoor mall, or densely populated building), the UE may use special features for communication. In a high-speed train scenario, the UE in the train travels at a high speed along a single directional line with clear position location (e.g., GNSS) information. Sensors, including the accelerometers, gyroscope, and GPS sensor, may be deployed to obtain this information. When the GPS signal is strong, it is inferred that the train is outdoors; if the signal is weak, the train is assumed to be in a tunnel. Additional context information, such as train ticket information, may be helpful for the phone to identify the high-speed train scenario.

In an indoor mall scenario, small cells are dense enough to support a large numbers of users. Usually, the UPS signal is weak, and the cellular network can provide only general position information. The sensing can build an environmental map to provide additional position information. In this scenario, sensing may help locate a landmark, and combine the landmark with the positioning information for localization.

Such diverse sensors provide large amounts of useful information, although the mapping between handover actions and sensor information may not be an easy linear calculation. Machine learning methods have powerful capabilities for many complicated issues, especially for black box or nonlinear issues. For example, in a real world scenario, sensing signals may be used for gesture recognition with machine learning. A convolutional neural network (CNN) may extract patterns from different gestures. Speed and directional information from sensors may represent different transportation statuses with processing by a machine learning model.

In one aspect of the present disclosure, machine learning methods are used for handover design and predictions. The machine learning model may take predefined sensor data as the input, and output the handover design information. The machine learning model operates with UE personal information while addressing privacy concerns.

Figure 8:
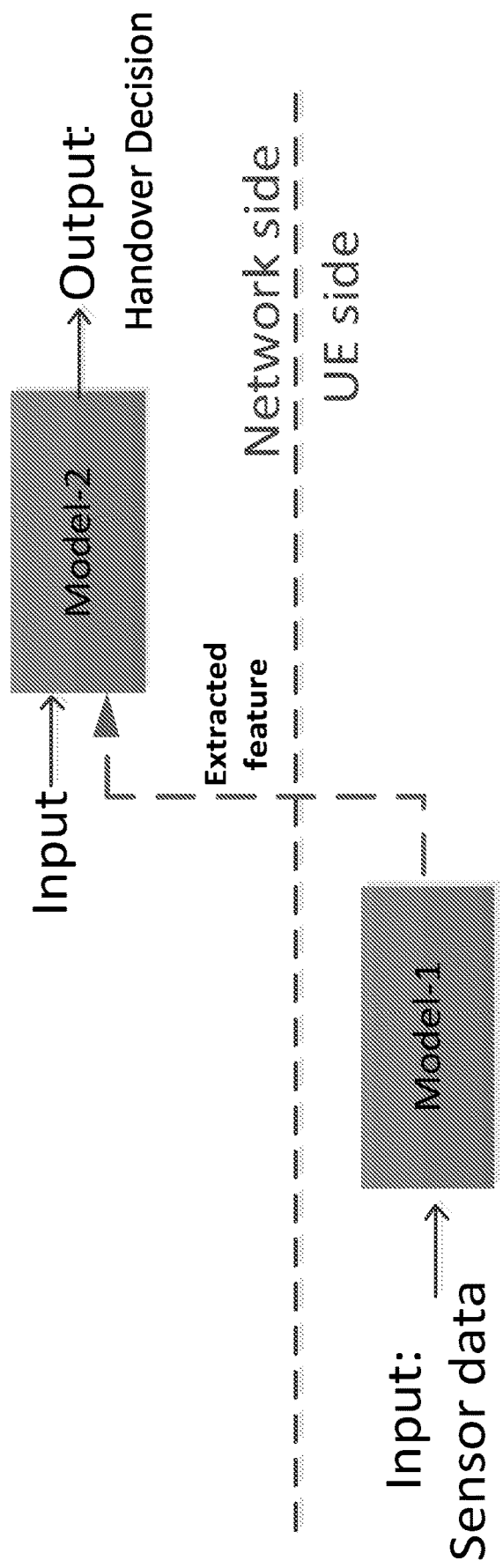
FIG. 8 is a block diagram showing a machine learning model for handover decisions, with a user equipment (UE) component and network component, in accordance with various aspects of the present disclosure.

FIG. 8 is a block diagram showing a machine learning model for handover decisions, with a local component and network component, in accordance with various aspects of the present disclosure. As shown in FIG. 8, a model includes two components, a UE side (model-1) and a network side (model-2), which are relatively independent.

A local machine learning model (model-1) is defined at the UE side, for example, with convolutional layers. The local model receives as input, the sensor data, captured at the UE side. The local model extracts features from the sensor data, which anonymizes the data. In aspects of the present disclosure, the output of the local model is compressed sensor features, which maintains the information for the handover decision while removing private personal information.

A network machine learning model (model-2) is defined at the network side, for example, at the base station with fully connected (FC) layers. The network machine learning model receives as input, the extracted features from the UE side. The network machine learning model also receives as input, other information for the handover decision. The network machine learning model makes the decision for the handover. The output of the network machine model is the handover decision or prediction. The network may feedback the handover information to the UE.

In aspects of the present disclosure, the network defines the overall model structure, including the UE side model (model-1) and the network side model (model-2). The network also defines the content of the input sensors for the UE side model. For example, the network defines which GPS/sensing/speed information will be the input of model-1. The content from each sensor is related to UE capability and the model structure. That is, the network may select sensors based on a structure of model-1, a structure of model-2, and/or UE capabilities. For example, an overall machine learning model related to high speed train scenarios may specify a first set of sensors. If the UE does not have those sensors available, the sensor selection will be limited to the high speed train scenario sensors available to the UE. The sensors for the input may include range and Doppler information (e.g., from the radar sensor), speed information (e.g., from the accelerometers), directional information (e.g., from the gyroscope), environmental information (e.g., from the camera image), and positioning information (e.g., from the GPS sensor).

In one example, the network defines a structure and network weights of model-1. In this example, the network defines the input as two dimensions of information including: positioning information from the GPS sensor and Doppler information from the radar sensor.

In one aspect of the present disclosure, an output of the overall model includes a handover decision for a current handover request. The handover decision includes the actual trigger of the handover and also the target cell.

In another aspect, the output of the overall model may predict handover actions for the current serving cell signal strength. For example, the current cell signal quality may not trigger the handover because the signal strength is above a threshold. However, based on the model prediction, there may be a target cell with a better signal. Thus, the model may trigger a handover to the better target cell, in other words, predict a handover based on current serving cell signal strength.

In yet another aspect, the output of the overall model may predict a future handover. In this aspect, the network makes the prediction based on a future position of the UE. For example, based on the UE movement, direction, and/or location information, the network may predict the handover for the future position.

According to aspects of the present disclosure, the network delivers model-1 to the UE side. The UE side model includes a model structure and corresponding neural network weights. An update of the model may be based on a UE request, or network control, or the update may occur in accordance with a predefined pattern.

UE requested updates, for example, may occur when the overall machine learning (ML) model fails with the handover procedure. This failure may occur when a proposed handover decision from the network causes the UE to access a cell with poor signal quality or the UE loses its connection to the target cell. The UE may report the failure and request the network to update the model to address the failure.

Network controlled updates, for example, may occur based on UE positioning information observed at the base station. In one example, the base station recognizes that the UE has moved from outdoors to an indoor mall. The network may provide an updated model, which matches the handover actions in the mall, to the UE. With the updated model, the UE may accurately execute a successful handover while inside the mall.

Updates may also occur in accordance with a predefined pattern. For example, the network may define a pattern in which the model updates every ten minutes when the UE is travelling with a speed less than 30 kilometers per hour and updates each minute when the UE is travelling at a speed faster than 30 kilometers per hour.

Aspects of the disclosure relate to handover failure recovery and activating or deactivating the machine learning handover procedures. In one aspect, an indication from the UE to the base station requests a switch from a machine learning-based handover to a traditional, non-machine learning-based handover. For example, if the UE does not make a successful handover based on the current machine learning model, the UE sends the indication of the failure to the network. The indication requests the network to update the machine learning model. The indication also requests the network to switch back to the traditional procedure, which configures resources for signal measurement to find a target cell and complete the handover procedure.

In another aspect, an indication from the base station to the UE triggers a machine learning model. For example, the network may store pre-optimized models for different scenarios (e.g., high-speed train or indoor mall scenarios). When the UE is in one of these scenarios, the network indicates the machine learning model for the UE to use. Similarly, the base station may also stop a machine learning model for various reasons. For example, the handover decision may be inaccurate, or the machine learning model may not be available. The machine learning model may not be available if a handover failure occurred after a machine learning decision, indicating the decision from the network is incorrect.

According to aspects of the present disclosure, the UE side model is pre-trained to extract the sensor features. The UE side model is optimized offline by the network to address privacy concerns. Optimization relates to the model structure and also training of the neural network weights. The optimization may be related to different UE capabilities or to different scenarios. For different scenarios (such as a high speed train scenario) the model or the weights may be selected and optimized differently. For different UE capabilities, consider an example where a first UE has a camera and voice sensors, whereas a second UE may have a camera, voice sensors and GPS sensors. Because of the different sensor output available for the different UEs, the machine learning model on the UE side would be different to match the different inputs. The extracted features from the UE side machine learning model would also be different. The network side machine learning model would also be different to match the different extracted features. Thus, for different LIE capabilities (such as different available sensors), there may be corresponding UE side models and network side models.

The network side model may also be pre-trained and may employ real-time optimization. The pre-trained model maps different structures to corresponding scenarios. For example, when a machine learning model decision procedure fails with sensor feature F from the UE side model, the UE switches to the traditional handover procedure to obtain a correct handover decision D. As a result, the network performs real-time optimization based on the feature F and decision D to correct the wrong decision.

Figure 9:
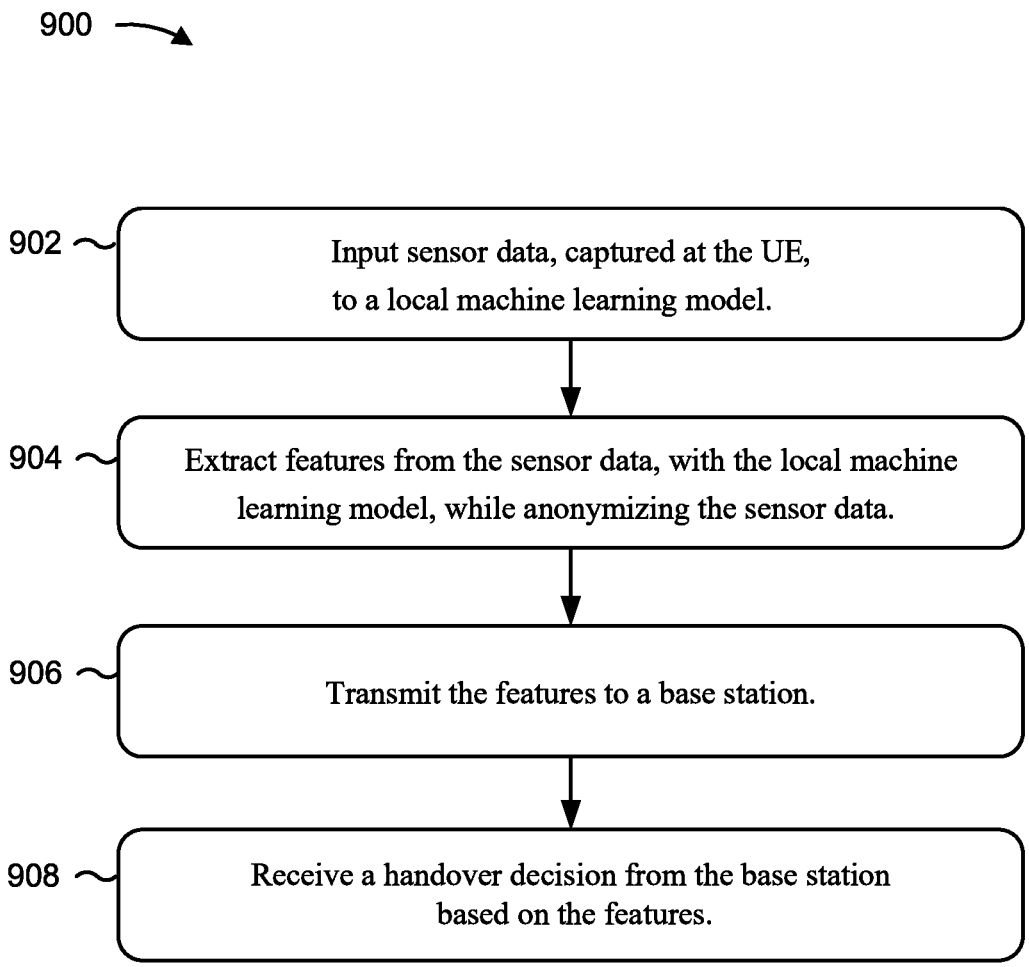
FIG. 9 is a flow diagram illustrating an example process performed, for example, by a user equipment (UE), in accordance with various aspects of the present disclosure.

FIG. 9 is a diagram illustrating an example process 900 performed, for example, by a UE, in accordance with various aspects of the present disclosure. The example process 900 is an example of a machine learning-based handover prediction. The prediction is based on sensor data captured at a wireless device.

As shown in FIG. 9, in some aspects, the process 900 may include inputting sensor data, captured at the UE, to a local machine learning model (block 902). For example, the user equipment (UE) (e.g., controller/processor 280, and/or memory 282) can input sensor data. In some aspects, the process 900 may include extracting features from the sensor data, with the local machine learning model, while anonymizing the sensor data (block 904). For example, the user equipment (UE) (e.g., controller/processor 280, and/or memory 282) can extract features from the sensor data.

As shown in FIG. 9, in some aspects, the process 900 may include transmitting the features to a base station (block 906). For example, the user equipment (UE) (e.g., antenna 252r, DEMOD/MOD 254r, TX MIMO processor 266, transmit processor 264, controller/processor 280, and/or memory 282) can transmit the features. The process 900 may also include receiving a handover decision from the base station based on the features (block 908). For example, the user equipment (UE) (e.g., antenna 252a, DEMOD/MOD 254a, MIMO detector 256, receive processor 258, controller/processor 280, and/or memory 282) can receive the decision.

Figure 10:
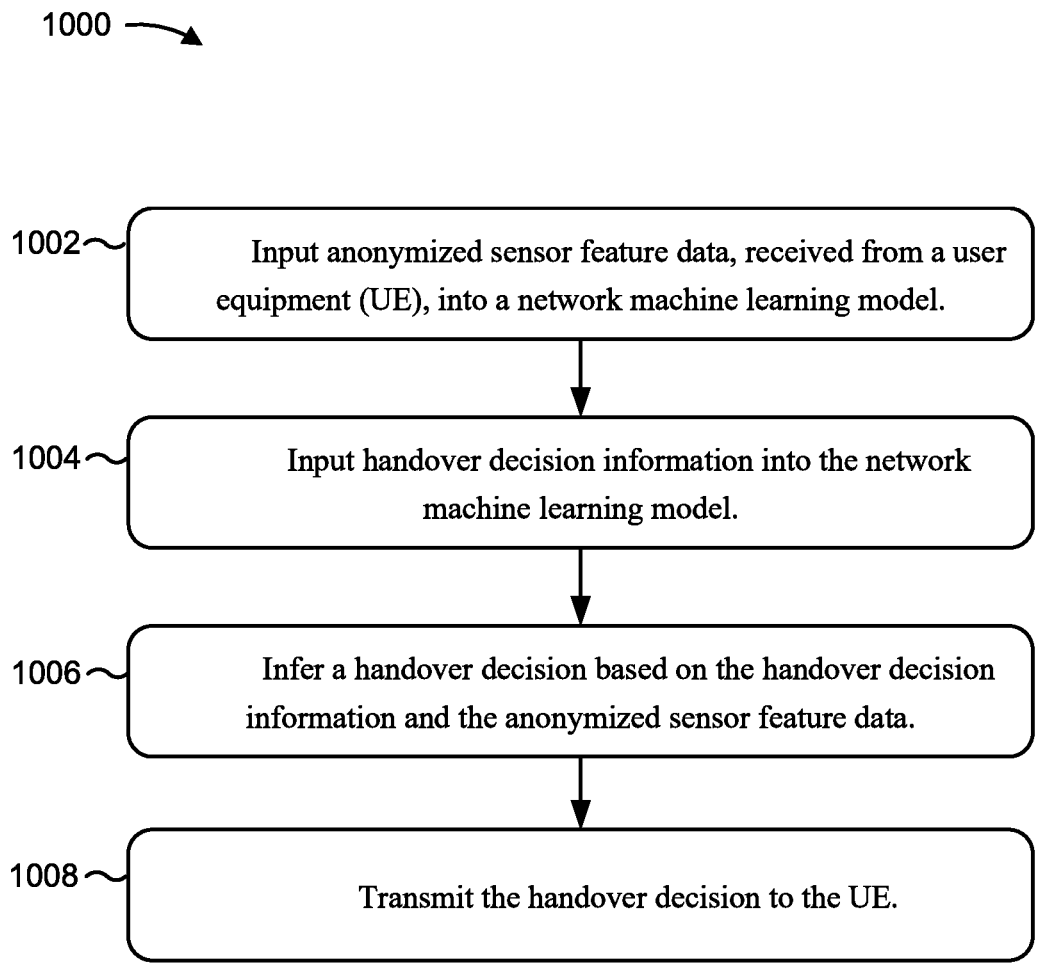
FIG. 10 is a flow diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. The example process 1000 is an example of machine learning-based handover prediction. The prediction is based on sensor data captured at a wireless device.

As shown in FIG. 10, in some aspects, the process 1000 may include inputting anonymized sensor feature data, received from a user equipment, into a network machine learning model (block 1002). For example, the base station (e.g., controller processor 240, and/or memory 242) can input the anonymized sensor feature data. The process 1000 may also input handover decision information into the network machine learning model (block 1004). For example, the base station (e.g., controller processor 240, and/or memory 242) can input the handover decision information.

As shown in FIG. 10, in some aspects, the process 1000 may include inferring a handover decision based on the handover decision information and the anonymized sensor feature data (block 1006). For example, the base station (e.g., controller processor 240, and/or memory 242) can infer the handover decision. The process 1000 may also include transmitting the handover decision to the UE (block 1008). For example, the base station (e.g., antenna 234, MOD/DEMOD 232, TX MIMO processor 230, transmit processor 220, controller processor 240, and/or memory 242) can transmit the handover decision to the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   inputting sensor data, captured at the UE, to a local machine learning model;
   extracting features from the sensor data, with the local machine learning model, while anonymizing the sensor data;
   transmitting the features to a base station; and
   receiving a handover decision from the base station based on the features.

2. The method of claim 1, further comprising receiving, from the base station, a list of sensors to generate the sensor data based on a capability of the UE and a structure of the local machine learning model.

3. The method of claim 2, in which the sensors comprise at least one of a radar sensor, an accelerometer, a gyroscope, a camera, and a position location sensor.

4. The method of claim 1, in which the handover decision comprises triggering of a handover at the UE and a target cell for the handover.

5. The method of claim 1, further comprising requesting an update to the local machine learning model in response to a handover failure, the update comprising at least one of an updated model structure or updated neural network weights.

6. The method of claim 1, further comprising receiving an update to the local machine learning model in response to a change in environment for the UE.

7. The method of claim 1, further comprising periodically receiving an update to the local machine learning model, a period for the updating based on a speed of the UE.

8. The method of claim 1, further comprising requesting a switch to a non-machine learning handover procedure, in response to failure of a machine learning handover procedure.

9. The method of claim 8, further comprising receiving an updated local machine learning model after requesting the switch.

10. The method of claim 1, further comprising receiving an indication to trigger a machine learning handover procedure.

11. The method of claim 10, in which the indication specifies a particular local machine learning model based on a scenario of the UE.

12. The method of claim 1, further comprising receiving an indication to stop a machine learning handover procedure.

13. The method of claim 12, further comprising receiving the indication to stop the machine learning handover procedure in response to an inaccurate handover decision or unavailability of a machine learning model, in which the machine learning becomes unavailable in response to an inaccurate decision.

14. The method of claim 1, in which the local machine learning model is based on a capability of the UE that corresponds to a type of sensors available at the UE.

15. A method of wireless communication by a base station, comprising:
inputting anonymized sensor feature data, received from a user equipment (UE), into a network machine learning model;
inputting handover decision information into the network machine learning model;
inferring a handover decision based on the handover decision information and the anonymized sensor feature data; and
transmitting the handover decision to the UE.

16. The method of claim 15, further comprising indicating to the UE which content from which sensor is to generate the anonymized sensor feature data based on a capability of the UE and/or a structure of the network machine learning model.

17. The method of claim 15, further comprising:
configuring the UE with a local machine learning model;
receiving a request to update the network machine learning model based on a handover failure by the UE; and
transmitting an updated structure for the local machine learning model or updated neural network weights for the local machine learning model.

18. The method of claim 15, further comprising:
configuring the UE with a local machine learning model; and
transmitting an updated structure for the local machine learning model or updated neural network weights for the local machine learning model based on positioning information observed from the feature data.

19. The method of claim 15, further comprising:
configuring the UE with a local machine learning model;
periodically transmitting an updated structure for the local machine learning model and/or updated neural network weights for the local machine learning model based on speed information observed from the feature data; and
increasing a frequency of transmitting the updated structure and/or the updated neural network weights when the feature data indicates the UE increased speed.

20. The method of claim 15, further comprising:
receiving an indication from the UE requesting a switch from a machine learning handover procedure to a non-machine learning handover procedure;
configuring resources for signal measurement to find a target cell; and
transmitting an updated structure for a local machine learning model or updated neural network weights for the local machine learning model in response to receiving the indication.

21. The method of claim 20, further comprising optimizing/training the network machine learning model in real time in response to an incorrect machine learning handover decision and an accurate non-machine learning handover decision.

22. An apparatus for wireless communications at a user equipment (UE), comprising:
a processor;
memory coupled with the processor; and
instructions stored in the memory and operable, when executed by the processor, to cause the apparatus:
to input sensor data, captured at the UE, to a local machine learning model;
to extract features from the sensor data, with the local machine learning model, while anonymizing the sensor data;
to transmit the features to a base station; and
to receive a handover decision from the base station based on the features.

23. The apparatus of claim 22, in which the processor causes the apparatus to receive, from the base station, a list of sensors to generate the sensor data based on a capability of the UE and a structure of the local machine learning model.

24. The apparatus of claim 22, in which the processor causes the apparatus to request for an update to the local machine learning model in response to a handover failure, the update comprising at least one of an updated model structure or updated neural network weights.

25. The apparatus of claim 22, in which the processor causes the apparatus to periodically receive an update to the local machine learning model, a period for the updating based on a speed of the UE.

26. The apparatus of claim 22, in which the processor causes the apparatus to request a switch to a non-machine learning handover procedure, in response to failure of a machine learning handover procedure.

27. The apparatus of claim 26, in which the processor causes the apparatus to receive an updated local machine learning model after requesting the switch.

28. The apparatus of claim 22, in which the processor causes the apparatus to receive an indication to trigger a machine learning handover procedure.

29. The apparatus of claim 28, in which the indication specifies a particular local machine learning model based on a scenario of the UE.

30. The apparatus of claim 22, in which the processor causes the apparatus to receive an indication to stop a machine learning handover procedure.

31. The apparatus of claim 30, in which the processor causes the apparatus to receive the indication to stop the machine learning handover procedure in response to an inaccurate handover decision or unavailability of a machine learning model, in which the machine learning becomes unavailable in response to an inaccurate decision.

32. The apparatus of claim 22, in which the local machine learning model is based on a capability of the UE that corresponds to a type of sensors available at the UE.

33. An apparatus for wireless communications at a base station, comprising:
- a processor;
- memory coupled with the processor; and
- instructions stored in the memory and operable, when executed by the processor, to cause the apparatus:
  - to input anonymized sensor feature data, received from a user equipment (UE), into a network machine learning model;
  - to input handover decision information into the network machine learning model;
  - to infer a handover decision based on the handover decision information and the anonymized sensor feature data; and
  - to transmit the handover decision to the UE.

34. The apparatus of claim 33, in which the processor causes the apparatus to indicate to the UE which content from which sensor is to generate the anonymized sensor feature data based on a capability of the UE and/or a structure of the network machine learning model.

35. The apparatus of claim 33, in which the processor causes the apparatus:
- to configure the UE with a local machine learning model;
- to receive a request to update the network machine learning model based on a handover failure by the UE; and
- to transmit an updated structure for the local machine learning model or updated neural network weights for the local machine learning model.

* * * * *